Patented Aug. 15, 1939

2,169,793

UNITED STATES PATENT OFFICE 2,169,793

PROCESS OF TREATING GLYCERIDES

Frederick E. Dearborn, Washington, D. C.; dedicated to the free use of the Public in the territory of the United States No Drawing. Application February 11, 1937, Serial No. 125,274

1 Claim. (Cl. 260—399)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

This invention relates to new compounds useful as insecticides and fungicides produced by the union of sulfur with a glyceride or glycerides of the unsaturated fatty acid or acids, containing not less than one double bond in the acid molecule, such as any of the glycerides of the acid series $C_nH_{2n-2}O_2$, $C_nH_{2n-4}O_2$, $C_nH_{2n-6}O_2$, and $C_nH_{2n-8}O_2$ After an extensive study, I have found that the glycerides of the unsaturated fatty acids can be made to combine with sulfur in the same manner as do the free unsaturated fatty acids described in my co-pending patent application Serial No. 125,273, filed February 11, 1937, the sulfur evidently combining with the fatty acid radical in the glyceride. The amount of sulfur combining with the glyceride molecule is dependent upon the nature of the unsaturated fatty acid. Triolein, the glyceride of oleic acid, contains three acid radicals as illustrated by the formula

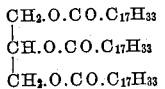

and since oleic acid contains only one double bond, only three molecules of sulfur can be added to the triolein molecule. On the other hand trilinolein

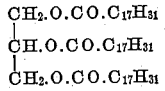

containing three molecules of linoleic acid which has two double bonds in the acid molecule, may unite with either three or six molecules of sulfur to form the mono- or the di-sulftrilinolein. The same reactions hold true with the glycerides of unsaturated fatty acids containing three or more double bonds in the acid molecule.

Most all vegetable and animal oils and fats as well as fish oils contain varying percentages of the glycerides of the unsaturated fatty acids. Peanut oil for example contains approximately 56 per cent triolein and 23 per cent trilinolein. Fish oil contains approximately 25 per cent triolein, 17 per cent tripalmitolein, 20 per cent trilinolein and 18 per cent triclupadonic glyceride. Wood oil contains approximately 72 per cent trielaeostearin and 13 per cent triolein. Hence when an oil is heated with sufficient sulfur, the sulf-glycerides of all of the unsaturated fatty acids will be formed. Sulf-glycerides have been prepared from corn, linseed, cottonseed, sesame, peanut, tung, fish, and other oils. The sulf-glycerides are dark amber colored viscous liquids becoming rubbery like solids in the higher sulfur compounds. They are neutral bodies, insoluble in water, alcohol and acetone. The mono- compounds are soluble in carbon tetrachloride, but the di-, tri-, etc., compounds are less soluble, forming jells. The self-glycerides may be hydrolized by digesting with alcoholic sodium or potassium hydroxide, with the formation of the sodium or potassium sulf- acid which may be salted out from solution in the usual way.

The procedure used in preparing the sulf-unsaturated fatty acid glycerides is to heat the glyceride, or an oil containing a relatively high per cent of the glyceride, with an excess of sulfur at a temperature ranging from 135-220° C. or above for a suitable length of time. The higher the temperature, the less time is required for the reaction. It is preferable not to heat too high as decomposition may result, especially with drying oils such as tung and linseed. The time of heating may be shortened by the use of a suitable catalyst. Iodine has been used. Below are given examples of the preparation of some of the sulf-glycerides. However, it is understood that deviations from the procedure given may be made without departing from the spirit of the invention.

*Example I.*—A mixture of 884.8 grams (1 mole) of triolein and 96.2 grams (3 moles) of flowers of sulfur are heated, with a few crystals of iodine added, at a temperature of 200° C. for two hours. The triolein gradually changing in color to a dark amber colored viscous liquid. The cooled liquid is soluble in carbon tetrachloride, in which it may be dissolved and filtered to separate from any unreacted sulfur and the solvent removed by distillation or evaporation.

*Example II.*—(a) A mixture of 878.8 grams (1 mole) of trilinolein and 96.2 grams (3 moles) of flowers of sulfur, are heated at 160° C. for two hours to produce the mono-sulftrilinolein compound. This compound is soluble in carbon tetrachloride and may be dissolved in it and filtered from any insoluble matter.

(b) The same amount of triolein as in (a) above is heated with 192.4 grams (6 moles) of flowers of sulfur at 170° C. for two hours to produce the di-sulftrilinolein. This compound is only slightly soluble in carbon tetrachloride, forming a gel.

*Example III.*—A mixture of 100 grams refined peanut oil and 20 grams of flowers of sulfur are heated at 220° C. for one and a half hours, using a few crystals of iodine as catalyst.

The product obtained is a heavy viscous liquid. It is of a dark amber color, insoluble in alcohol, acetone, but soluble in carbon tetrachloride.

Having fully disclosed my invention, I claim:

A process of producing new insecticidal and fungicidal sulphur compounds of the glycerides of the long chain unsaturated fatty acids, which process comprises introducing sulphur into the double bonds of the glyceride by heating the glyceride with sulphur at a temperature of 135° to 220° C., using iodine as a catalyst.

FREDERICK E. DEARBORN.